(12) United States Patent
Santiago

(10) Patent No.: US 10,182,554 B1
(45) Date of Patent: Jan. 22, 2019

(54) BALL-FETCHER PROJECTION DEVICE

(71) Applicant: Edwin Santiago, San Francisco, CA (US)

(72) Inventor: Edwin Santiago, San Francisco, CA (US)

( * ) Notice: Subject to any disclaimer, the term of this patent is extended or adjusted under 35 U.S.C. 154(b) by 0 days.

(21) Appl. No.: 15/435,069

(22) Filed: Feb. 16, 2017

(51) Int. Cl.
| | |
|---|---|
| *F41B 7/08* | (2006.01) |
| *A01K 15/02* | (2006.01) |
| *A63B 69/40* | (2006.01) |
| *F41B 7/00* | (2006.01) |

(52) U.S. Cl.
CPC .......... *A01K 15/025* (2013.01); *A63B 69/407* (2013.01); *F41B 7/003* (2013.01); *F41B 7/08* (2013.01)

(58) Field of Classification Search
CPC .................................. F41B 7/003; F41B 7/08
See application file for complete search history.

(56) References Cited

U.S. PATENT DOCUMENTS

| 3,850,157 | A | * | 11/1974 | Prokupek | A63B 69/407 124/27 |
| 5,292,134 | A | * | 3/1994 | Schlundt | A63B 65/122 124/65 |
| 5,979,424 | A | * | 11/1999 | Alvarez | F41B 7/08 124/16 |
| 7,726,292 | B1 | * | 6/2010 | Coleman | F41B 7/08 124/27 |
| 7,823,571 | B2 | | 11/2010 | Williamson | |
| 8,245,702 | B2 | | 8/2012 | Lendvay et al. | |
| 8,393,299 | B1 | | 3/2013 | Bernat | |

* cited by examiner

*Primary Examiner* — John Ricci

(57) ABSTRACT

A ball-fetcher projection device including an elongated cylindrical barrel having an interior tube, a closed end, an open end, a lower rear surface, and a top surface. An interior guided track is disposed along a length of the interior tube of the cylindrical barrel, and a moveable spring-loaded firing ram has a front end and a back end. The moveable spring-loaded firing ram is mounted to the guided track along the interior tube of the cylindrical barrel. A ball is loaded within the cylindrical barrel. A moveable cocking mechanism is disposed on the front end of the firing ram and is engageable by a user. A handle has a trigger device mounted to the lower rear surface of the cylindrical barrel. The trigger device is engageable with the cocking mechanism.

2 Claims, 4 Drawing Sheets

BALL-FETCHER PROJECTION DEVICE

BACKGROUND OF THE INVENTION

Various types of ball projecting apparatuses are known in the prior art. However, what has been needed is a ball-fetcher projection device that includes an elongated cylindrical barrel having an interior tube and an open scoop at an open end of the cylindrical barrel. What has been further needed is an interior guided track that is disposed along the interior tube of the cylindrical barrel. Lastly, what has been needed is a moveable spring-loaded firing ram attachable to the track, and a handle having a trigger device that is engageable with a moveable cocking mechanism. The ball-fetcher projection device thus allows a user to easily play fetch with a pet dog without the need to strain his body while throwing or picking up a ball.

FIELD OF THE INVENTION

The present invention relates to ball projecting apparatuses, and more particularly, to a ball-fetcher projection device.

SUMMARY OF THE INVENTION

The general purpose of the ball-fetcher projection device, described subsequently in greater detail, is to provide a ball fetcher projection device that has many novel features that result in the ball-fetcher projection device that is not anticipated, rendered obvious, suggested, or even implied by prior art, either alone or in combination thereof.

To accomplish this, the ball-fetcher projection device includes an elongated cylindrical barrel, optionally a clear material, having an interior tube, a closed end, an open end, a lower rear surface, and a top surface. An open scoop is disposed on the open end of the cylindrical barrel. An interior guided track is disposed along a length of the interior tube of the cylindrical barrel. Additionally, a back end of a moveable spring-loaded firing ram is affixed to the closed end of the cylindrical barrel. A ball is loaded to a front end of the moveable spring-loaded firing ram.

The ball-fetcher projection device further includes a cocking mechanism having a rectangular top disposed on the front end of the firing ram. The cocking mechanism is moveable on the guided track along the length of the interior tube of the cylindrical barrel, and the rectangular top of the cocking mechanism extends out of the top surface of the cylindrical barrel. A handle with a trigger device is mounted to the lower rear surface of the cylindrical barrel. The trigger device is engageable with the cocking mechanism.

Thus has been broadly outlined the more important features of the ball-fetcher projection device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
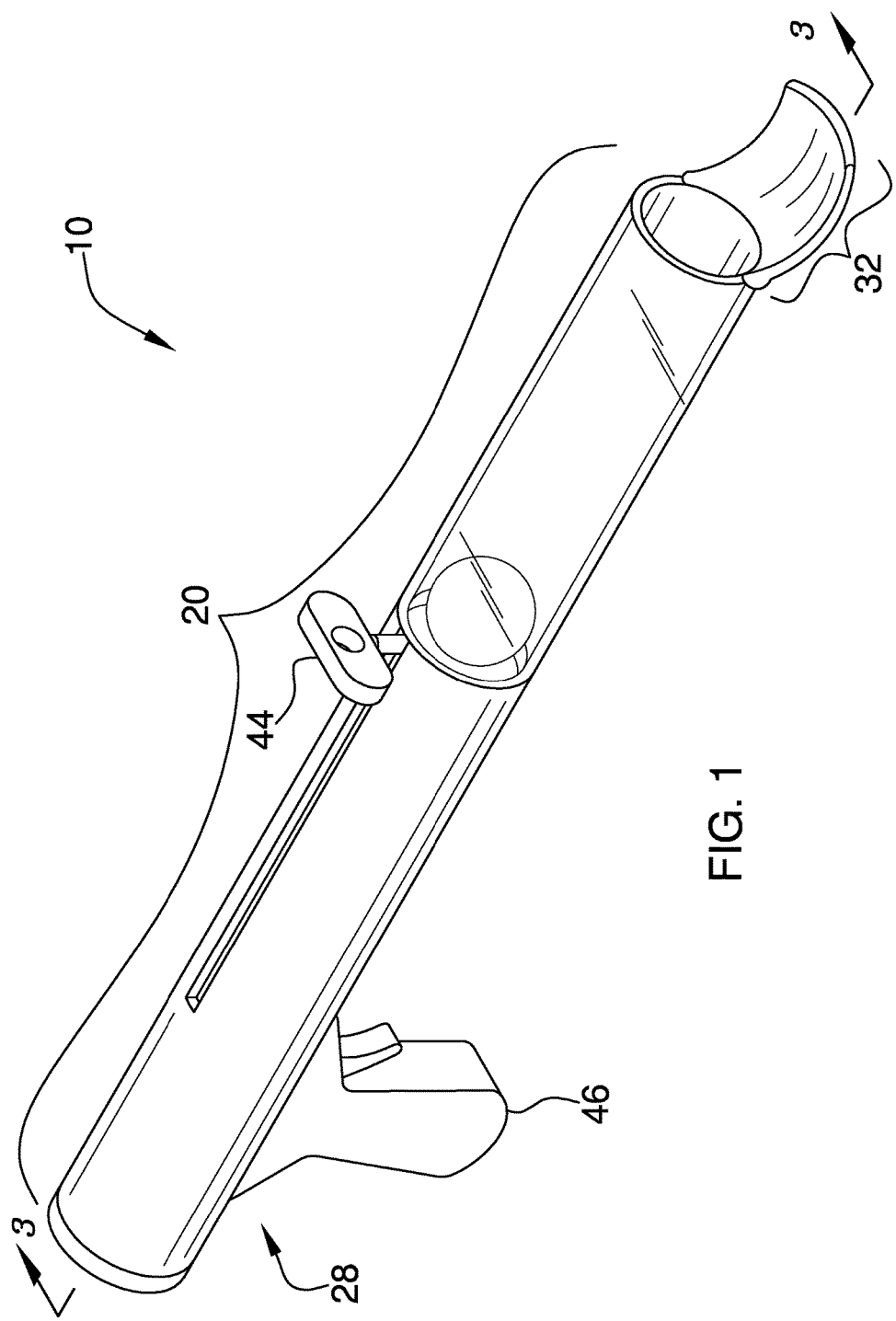
FIG. 1 is a front isometric view.
Figure 2:
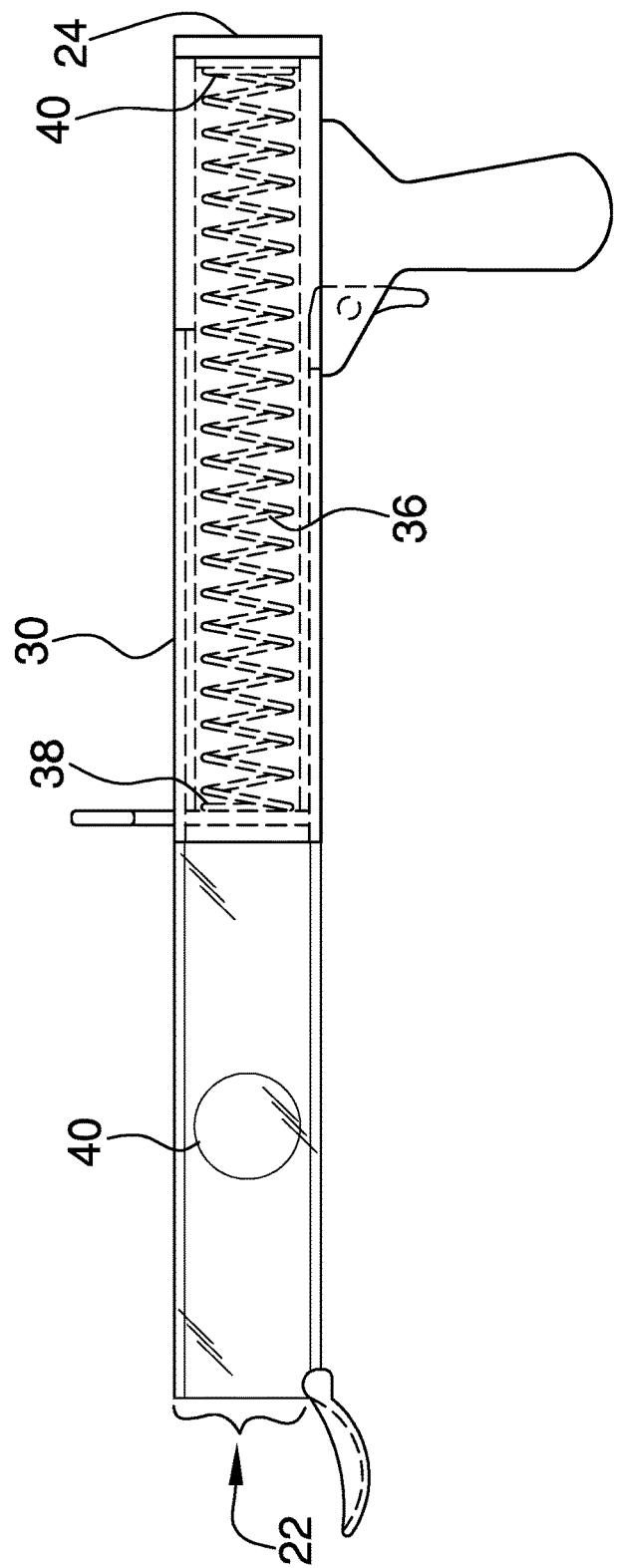
FIG. 2 is a cross-sectional side view.
Figure 3:
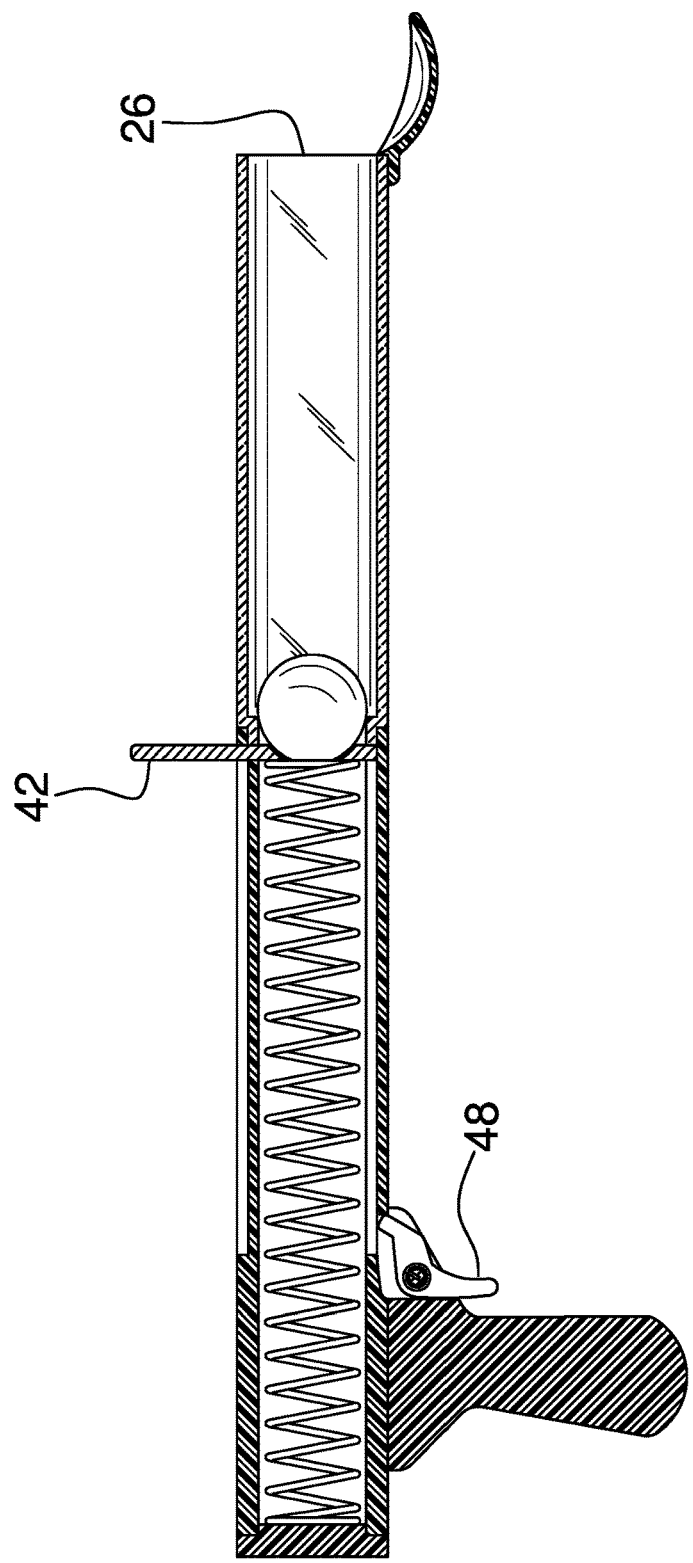
FIG. 3 is a cross-sectional side view showing a ball-fetcher projection device in a released state.
Figure 4:
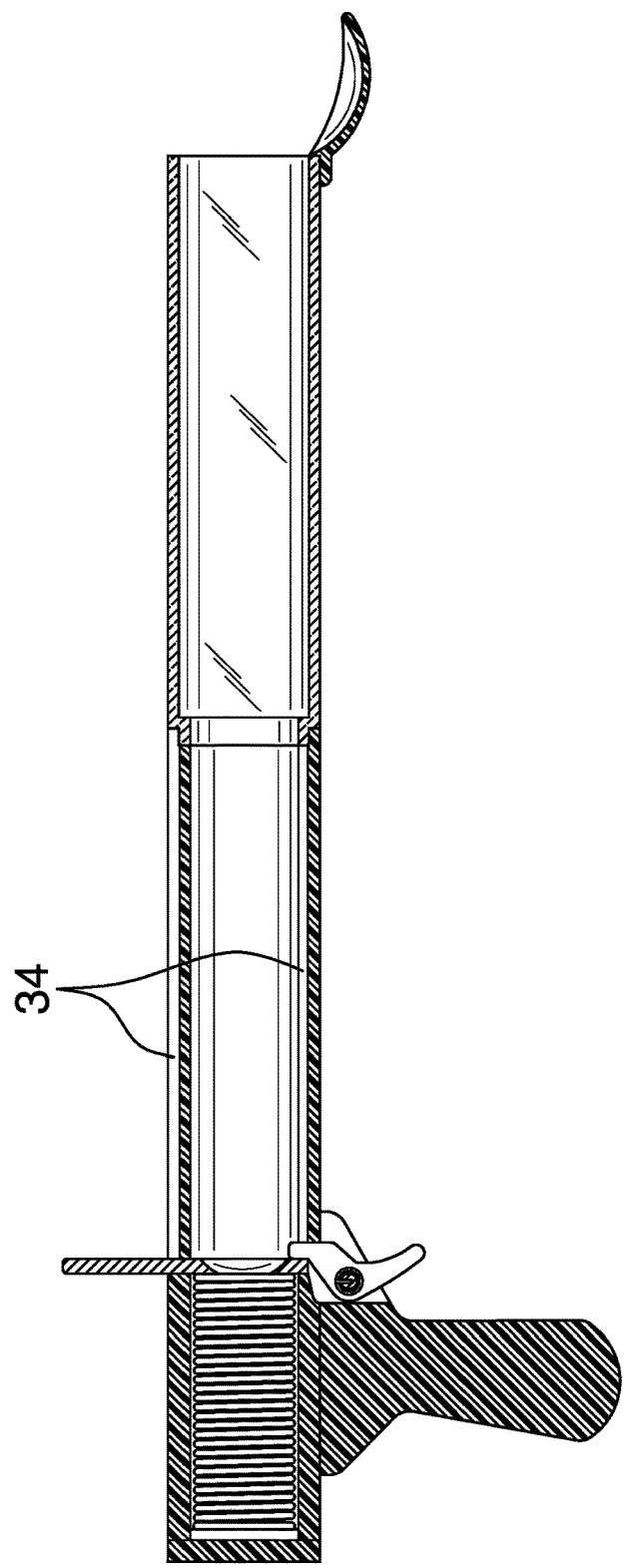
FIG. 4 is a cross-sectional side view showing the ball-fetcher projection device in a cocked state.

With reference now to the drawings, and in particular FIGS. 1 through 4 thereof, an example of a ball-fetcher projection device employing the principles and concepts of the present ball-fetcher projection device and generally designated by the reference number 10 will be described.

Referring to FIGS. 1 through 4 the present ball-fetcher projection device 10 is illustrated. The ball-fetcher projection device 10 includes an elongated cylindrical barrel 20. The barrel has an interior tube 22, a closed end 24, an open end 26, a lower rear surface 28, and a top surface 30. The open end of the cylindrical barrel has an open scoop 32. An interior guided track 34 is disposed along the length of the interior tube 22 of the cylindrical barrel 20. A moveable spring-loaded firing ram 36 has a front end 38 and a back end 40. The moveable spring-loaded firing ram 36 is mounted to the guided track 34 along the interior tube 22 of the cylindrical barrel 20. The spring-loaded firing ram 36 is affixed to the closed end 24 of the cylindrical barrel 20. A ball 40 is loaded in the open end 26 of the cylindrical barrel 20 to the front end 40 of the spring-loaded firing ram 36.

There is a moveable cocking mechanism 42 with a rectangular top 44. The cocking mechanism 42 is disposed on the front end 38 of the firing ram 36 and is moveable along the guided track 34 in the interior tube 22 of the cylindrical barrel 20. Moreover, the rectangular top 44 of the cocking mechanism 42 extends past the top surface 30 of the cylindrical barrel 20 and is engageable by a user.

Furthermore, the ball-fetcher projection device 10 has a handle 46 mounted to the lower rear surface 28 of the cylindrical barrel 20. A trigger device 48 is mounted to the handle 46 at the lower rear surface 28 of the cylindrical barrel 20. The trigger device 48 is engageable with the cocking mechanism 42 in the interior tube 22 of the cylindrical barrel 20.

What is claimed is:
1. A ball-fetcher projection device comprising:
an elongated cylindrical barrel having an interior tube, a closed end, an open end, a lower rear surface, and a top surface;
an open scoop disposed on the open end of the cylindrical barrel;
an interior guided track disposed along a length of the interior tube of the cylindrical barrel, said interior guided track being positioned to extend along the top surface of the elongated cylindrical barrel;
a moveable spring-loaded firing ram having a front end and a back end, wherein the moveable spring-loaded firing ram is mounted to the guided track along the interior tube of the cylindrical barrel, wherein the back end of the spring-loaded firing ram is affixed to the closed end of the cylindrical barrel;
a ball loadable within the front end of the spring-loaded firing ram;
a moveable cocking mechanism having a rectangular top, wherein the cocking mechanism is disposed on the front end of the moveable spring-loaded firing ram and is moveable along the guided track along the length of the interior tube of the cylindrical barrel;
wherein the rectangular top of the moveable cocking mechanism is extended past the top surface of the cylindrical barrel rectangular top and engageable by a user;

a handle mounted to the lower rear surface of the cylindrical barrel wherein the handle is oppositionally positioned on the elongated cylindrical barrel relative to the interior guided track such that the cocking mechanism is extends from the top surface and is configured for use as an aiming mechanism; and a trigger device mounted to the handle;

wherein the trigger device is engageable with the moveable cocking mechanism within the interior tube of the elongated cylindrical barrel.

2. The ball-fetcher projection device of claim 1 wherein the cylindrical barrel is a clear material.

\* \* \* \* \*